US007200565B2

(12) United States Patent
Basson et al.

(10) Patent No.: US 7,200,565 B2
(45) Date of Patent: Apr. 3, 2007

(54) SYSTEM AND METHOD FOR PROMOTING THE USE OF A SELECTED SOFTWARE PRODUCT HAVING AN ADAPTATION MODULE

(75) Inventors: Sara H. Basson, White Plains, NY (US); Dimitri Kanevsky, Ossining, NY (US); Wlodek W. Zadrozny, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 1021 days.

(21) Appl. No.: 09/836,152

(22) Filed: Apr. 17, 2001

(65) Prior Publication Data

US 2003/0078828 A1    Apr. 24, 2003

(51) Int. Cl.
*G06F 17/30* (2006.01)
(52) U.S. Cl. .......................................... 705/10; 705/14
(58) Field of Classification Search .................. 705/10
See application file for complete search history.

(56) References Cited

U.S. PATENT DOCUMENTS

| 5,737,725 | A | * | 4/1998 | Case .......................... 704/260 |
| 5,754,938 | A | * | 5/1998 | Herz et al. .................. 725/116 |
| 5,758,323 | A | * | 5/1998 | Case .......................... 704/278 |
| 6,122,614 | A | * | 9/2000 | Kahn et al. .................. 704/235 |
| 6,163,768 | A | * | 12/2000 | Sherwood et al. .......... 704/235 |
| 6,345,252 | B1 | * | 2/2002 | Beigi et al. ................. 704/272 |
| 6,442,519 | B1 | * | 8/2002 | Kanevsky et al. .......... 704/243 |
| 6,477,493 | B1 | * | 11/2002 | Brooks et al. ............... 704/246 |
| 6,490,558 | B1 | * | 12/2002 | Kahn et al. .................. 704/235 |
| 6,529,873 | B1 | * | 3/2003 | Owen .......................... 704/260 |
| 6,697,796 | B2 | * | 2/2004 | Kermani ........................ 707/3 |
| 6,704,709 | B1 | * | 3/2004 | Kahn et al. .................. 704/235 |
| 6,766,295 | B1 | * | 7/2004 | Murveit et al. ............. 704/243 |
| 6,832,189 | B1 | * | 12/2004 | Kanevsky et al. .......... 704/235 |
| 7,069,513 | B2 | * | 6/2006 | Damiba ....................... 715/738 |

(Continued)

FOREIGN PATENT DOCUMENTS

WO    WO 0055781    *  3/2000

OTHER PUBLICATIONS

O'Mahony Sheila et al., The Impact of Celebrity Endorsements on Consumers Irish Marketing Review, 1997/1998, vol. 10, No. 2, pp. 15-24.*

(Continued)

*Primary Examiner*—Romain Jeanty
*Assistant Examiner*—Scott L. Jarrett
(74) *Attorney, Agent, or Firm*—Rafael Perez-Pineiro (57) ABSTRACT

A method for promoting use of a product having an adaptation module is provided comprising the steps of: providing sample data of a person; accessing the sample data associated with the person; using the sample data to adapt the product to the person utilizing the adaptation module of the product; making the product available to the person; tracking use of the adapted product by the selected person; storing data in the person database as tracking data associated with the selected person; obtaining feedback data from the selected person regarding the selected person's satisfaction with the product; storing the feedback data in the person database in association with the selected person; incorporating the tracking data and the feedback data associated with the selected person into an advertisement; and advertising the product.

17 Claims, 3 Drawing Sheets

U.S. PATENT DOCUMENTS

2003/0033192 A1* 2/2003 Zyman et al. ................ 705/10

OTHER PUBLICATIONS

Agrawal, Jagdish et al., The Economic Worth of Celebrity Endorsers: An Event Study Analysis Journal of Marketing, Jul. 1995, vol. 59, No. 3, pp. 56-62.*

Ketcham, Steve, Celebrity endorsements are a thing of the past (and present) The Old Times, Feb. 2001, Retrieved from www.theoldtimes.com/past/0201_2.html.*

EPM Communications—The Liscensing Letter and Liscensing Sourcebook web pages Retrieived from www.epmcom.com, Mar. 21, 2005.*

Cleaver, Joanne, The Midas Touch: Celebs try hand at building brands Marketing News, vol. 32, No. 12, Jun. 8, 1998.*

Burrelles.com—Web Pages Feb.-Dec. 2000, Retrieved from Archive.org Oct. 3, 2005.*

Burrelles Information Office Product Brochure Dec. 2000, Retrieved from Archive.org Oct. 3, 2005.*

Newman, Dan; The Dragon Naturally Speaking Guide Second Edition for Dragon 4 Waveside Publishing, 2000, ISBN: 0-9670389-7-9.*

Nash, Edward, Database Marketing—The Ultimate Marketing Tool McGraw-Hill, 1993, ISBN: 0-07-046063-9.*

Orfali, Robert et al., Client/Server Guide Third Edition John Wiley & Sons, 1999, ISBN: 0-471-31615-6.*

Cooper, Alan, About Face—The essentials of user interface design Programmers Press, 1995. ISBN: 1-56884-322-4.*

Ramakrishnan, Raghu et al., Database Management Systems Third Edition McGraw-Hill, 2003, ISBN: 0-07-246563-8.*

Dougherty, Philip, Advertising M*A*S*H Renunion for I.B.M. The New York Times, Apr. 3, 1997.*

McCracken, Grant, Who is the Celebrity Endorser? Cultural Foundations of the Endorsement Process The Journal of Consumer Research, vol. 16, No. 3, Dec. 1989, pp. 310-321.*

Roobina, Ohanian, Construction and Validation of a Scale to Measure Celebrity Journal of Advertising, 1990, vol. 19, No. 3, pp. 39-52.*

Warneford, Penny, IBM strategy: Tout "There is a difference" Brandweek, Oct. 10, 1994, vol. 35, No. 39, p. 2.*

Johnson, Roy, The Jordan Effect—The world's greatest basketball plaer is also one of its great brands. What is his impact on the economy?, Fortune Magazine, Jun. 22, 1998.*

Computer recognize speech Technology Review, Sep./Oct. 1998, vol. 101, No. 5, pp. 61-64.*

Till, Brian D., Using celebrity endorsers effectively: lessons from associative learning The Journal of Product and Brand Management, 1998, vol. 7, No. 5.*

Adler, Alan S, Speech recognition software, round III: Dragon vs. ViaVoice Law Office Computing, Dec. 1998/Jan. 1999, vol. 8, No. 6.*

Erdpgan, Zafer B et al., Celebrity Endorsement: Advertising Agency's Manager's Perspective Cyber Journal of Sport Marketing, 1999, vol. 3, No. 3.*

Durham, Deborah, How to get the biggest bang out of your next spokesperson campaign Public Relations Quarterly, Spring 1997, vol. 42, No. 1.*

Miciak, Alan et al., Choosing Celebrity Endorsers Advertising Management Magazine, Winter 1994.*

Schmidt, Steve, Now hear this Law Office Computing, Oct./Nov. 1999, vol. 9, No. 5, pp. 40-43.*

Smedman, Lorna, Brave new yackety-yak Inside MS, Winter 1999, vol. 17, No. 1, pp. 50-56.*

Lefton, Terry, Rebooting sponsorships Brandweek, Feb. 7, 2000, vol. 40, No. 6, pp. 18, 20.*

Heim, Sarah, Winning Combo Ad Week, Sep. 25, 2000, pp. 72, 74.*

Kay, David et al., Dragon NaturallySpeaking for Dummies For Dummies, Oct. 1999, ISBN: 0764506382.*

Spokespersons.com Web Pages Spokespersons Plus Network, Dec. 1998/Apr. 1999, Retrieved from Archive.org Feb. 15, 2006.*

Ojala, Marydee, Broadcast News Comes to your Micro Link-Up, Mar. /Apr. 1991, vol. 8, No. 2.*

Ojala, Marydee, Online Broadcast News: From Television Screen to Computer Screen Database, Apr. 1991, vol. 14, No.2.*

Burrelle's Selects Fulcrum Software for Web-Enabled Clipping Management Software Business Wire, May 27, 1998.*

Bates, Mary Ellen, Electronic clipping services Oneline, Jul. 1994, vol. 18, No. 4.*

Martinez, Kimiko L., Celebrity Endorsements Entrepreneur.com May 2001.*

Saba, Jennifer, Output MC Technology Marketing Intelligence, vol. 19, No. 2, Feb. 1999.*

Schwartz, Ephraim, Speech gets amplified search capabilities InfoWorld, vol. 21, No. 8, Feb. 22, 1999.*

Bowen, Charles, From sound bites to computer bytes Editor & Publisher, vol. 133, No. 38, Sep. 18, 2000.*

* cited by examiner

| |
|---|
| RECORD NUMBER — 302 |
| NAME — 304 |
| CLASSIFICATION DATA — 306 |
| PRIORITY DATA — 308 |
| CONTACT DATA — 310 |
| HISTORY DATA — 312 |
| ASSOCIATED PERSON(S) LINK(S) — 314 |
| ACCESSING DATA — 316 |
| RECORDING INSTRUMENTATION DATA — 318 |
| RECORDING SAMPLE ADAPTATION DATA LINKS — 320 |
| PREFERENCE DATA — 322 |
| TRACKING DATA — 324 |
| FEEDBACK DATA — 326 |
| COMPLETE RECORD FIELD — 328 |

FIG. 3

SYSTEM AND METHOD FOR PROMOTING THE USE OF A SELECTED SOFTWARE PRODUCT HAVING AN ADAPTATION MODULE

FIELD OF THE INVENTION

This invention generally relates to the field of recognition software products, and more specifically to the promotion of automatic speech recognition and recognition security system products.

BACKGROUND OF THE INVENTION

Developments in software, particularly in artificial intelligence and pattern recognition have led to the development of a variety of recognition software products. Recognition software recognizes features of one or more aspects of a user.

One example of a recognition software product is an Automatic Speech Recognition (ASR) product for recognizing the speech of a user. ASR products may be designed for personal and business use such as in a desktop speech recognition system. An ASR product receives an input of live or recorded speech, and recognizes elements of the speech such as the words. The ASR product may convert the recognized speech into text, such as for dictation. The ASR product may also use the recognized speech for enabling the user to communicate with a device, such as for instructing the device to perform a task and for asking the device for information. However, ASR products have experienced poor sales. Furthermore, ASR products have experienced a low rate of use after purchase.

Another example of a type of recognition product is recognition security products for controlling use or entry of a variety of entities such as a computer or a house. Recognition security products may use a variety of types of personal data for determining the identity of a person. The recognition security system receives input personal data and compares it to stored personal data. Examples of personal data include images (such as photographs and video recordings), voice data, other types of biometric data, behavioral passwords such as gestures, and personal facts related to an individual, such as place of birth, mother's maiden name, current home address, etc.

Recognition products may be designed for use with specific users that have trained the recognition product to be familiar with each specific user's idiosyncrasies relevant to the recognition product so that the product adapts to the specific user. These recognition products include adaptation software for facilitating adaptation of the recognition product for each user of the product. The adaptation software allows each user to train the product. The user provides the adaptation software with a sample(s) of the aspect being recognized. During a training period the adaptation software uses the sample to adapt the product to effectively recognize data submitted by a user during normal use of the product.

For example, when training an ASR the user provides the adaptation software of the ASR product with samples of the user's speech so that the ASR product can adapt to the user's particular voice and speech style. For a security video recognition product that uses images of a user's face captured by a camera such as a video camera, the user provides the adaptation software of the product with sample recorded images of the user's face so that the product can adapt to recognize the face of the user. For a security voice recognition product that uses the voice of a user captured by a device such as a microphone, the user provides the adaptation software of the product with sample recorded vocal data of the user's voice so that the product can adapt to recognize the voice of the user.

However, the training process is time consuming and intimidating to purchasers of recognition products, so that purchasers and other prospective users are likely to postpone training of the recognition products, and accordingly not to use the recognition product. Recognition products may be designed for use without requiring training of the product, such as ASR products designed for recognizing speech independent of the speaker. However user independent recognition products, such as speaker independent ASR products, are lacking in accuracy, which also discourages use. Due to the low rate of use of recognition products, potential buyers and users do not perceive it to be stylish or fashionable to use a recognition product, and are not motivated to buy or use a recognition product.

SUMMARY

Accordingly, there exists a need for promoting use of recognition products so that it is perceived as stylish and fashionable to use the recognition products. Furthermore, there exists a need to eliminate the requirement for a prospective user to train a recognition product.

An aspect of the present invention is to provide a method for promoting recognition products for increasing use and sales thereof by non-intrusively accessing personal data associated with a person having a high public profile, and adapting a recognition product to the person having a high public profile using the accessed personal data (with or without the knowledge of the person having a high public profile).

A further aspect of the present invention is to provide a method for promoting recognition products for increasing use and sales thereof by providing a person having a high public profile with an already adapted recognition product for increasing use of the product by persons having a high public profile.

Accordingly, a method is provided for promotion of a recognition product having adaptation software for promoting sales and use thereof by increasing the popularity of the recognition product by increasing the quantity of persons having a high public profile using the product and advertising their use thereof comprising the steps of: selecting a product to be promoted in accordance with a request from an owner of the product; accessing a database of high public profile persons (HPP); selecting a person from the database in accordance with priority data and preference data stored in the high public profile person database; accessing in a non-intrusive manner data samples associated with the selected HPP person, that are available to the public, to be sample adaptation data; adapting the selected product to the selected HPP person using the sample adaptation data; tracking use of the adapted recognition product by the selected HPP person to obtain tracking data; requesting and receiving feedback data regarding satisfaction of the selected HPP person with the product; and when tracking data and feedback data indicate that the selected HPP person has used the recognition product and is satisfied with the recognition product, advertising use of the recognition product by the selected HPP person.

Furthermore, a system is provided for promotion of a recognition product for promoting sales and use thereof comprising a server and a person database accessed by the server, wherein the server accesses sample data associated with a person, the sample data being usable by an adaptation module of a product for adapting the product to the person, and wherein the server uses the sample data to adapt the product to the person. The person database stores at least one entry storing data associated with a person for adapting the product to the person. The server accesses the data associated with a selected person for adapting the product to the selected person. The associated data includes accessing data providing instructions for accessing sample data. The server accesses the person database to retrieve the accessing data and uses the accessing data to access the sample data.

BRIEF DESCRIPTION OF THE FIGURES

The above and other objects, features and advantages of the present invention will become more apparent from of the following detailed description of an exemplary embodiment thereof taken in conjunction with the attached drawings, in which.

DETAILED DESCRIPTION OF THE INVENTION

Figure 1:
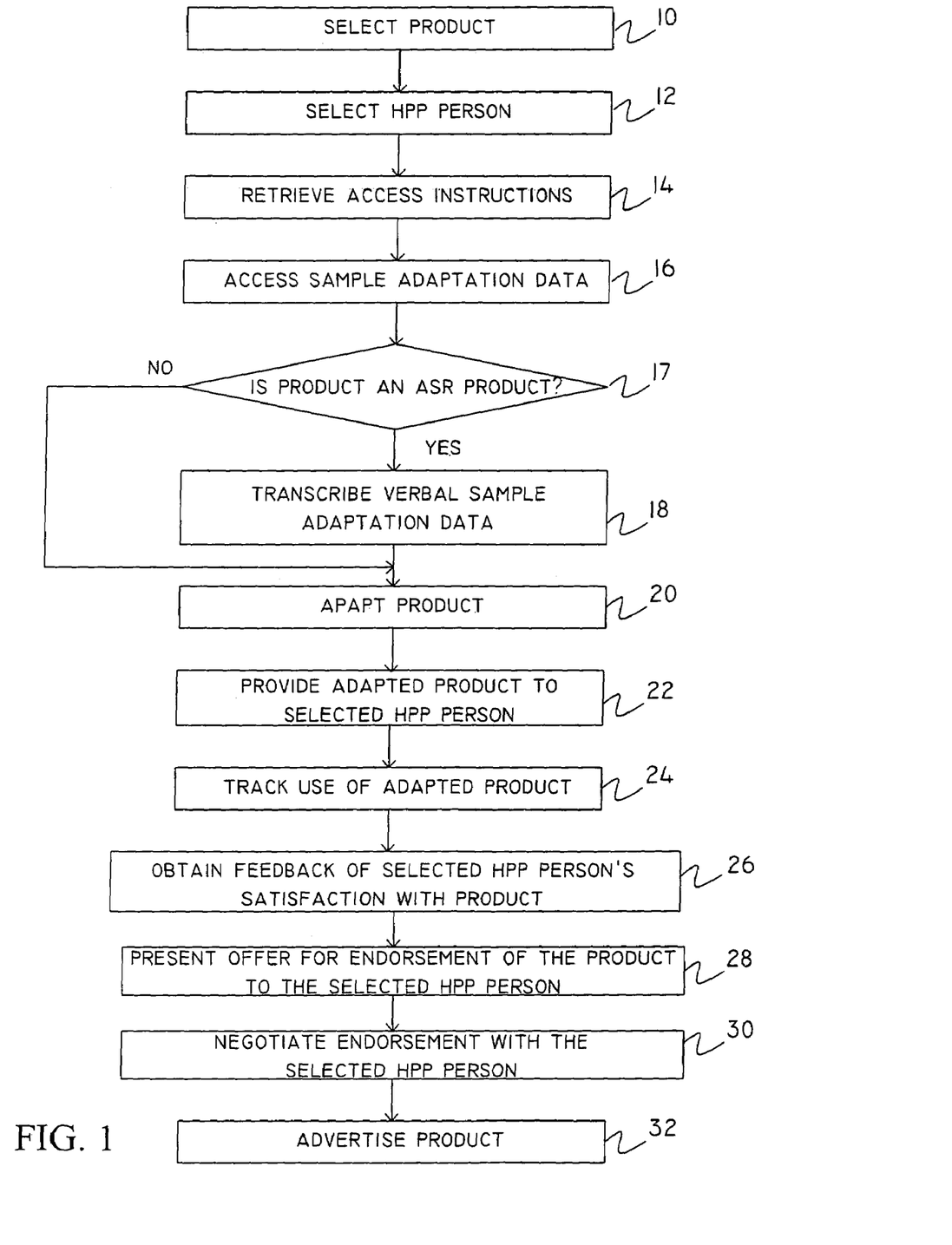
FIG. 1 is a flowchart setting forth a method in accordance with a first embodiment of the present invention.

A preferred embodiment of the present invention will be described herein below with reference to the accompanying drawings. In the drawings, like reference numerals represent similar or identical elements throughout the various figures. A flowchart of a method for promoting use of a recognition product having an adaptation software module in accordance with the preferred embodiment of the present invention is shown in FIG. 1. At step 10 a product is selected from a collection of one or more products, the selected product being the product that is to be promoted The product may be, for example, an ASR product, a recognition security product, a user identification product, or a user verification product for entry to a device such as a computer or an embedded device.

At step 12, a selection is made of a person having a high public profile. The person is selected from a database storing data associated with at least one high profile person (HPP). As described below, the selection is made according to the availability of data associated with the person as needed for adaptation of the selected product and the person's popularity in a population being targeted by the promotion. Upon selection, the person may or may not be notified that he/she was selected for adapting the selected product to he person. Data stored in the database associated with each high profile person comes from sources available to the public that are legal to access.

At step 14, access instructions for how to access sample adaptation data associated with the selected high public profile person are retrieved from the database storing data associated with HPP persons. The instructions provide information regarding what, where, when and how to access sample adaptation data to be used for adapting the selected product to the selected person. Sample adaptation data is accessed from sources that are available to the public that are legal to access. The instructions for how to access sample adaptation data include instructions to devices and/or operators of devices for accessing and preferably recording the data. The devices may be, for example, an audio recorder, a video recorder such as a camcorder or a VCR.

The sample adaptation data is data that is usable by the adaptation module of the product for adapting the product to the user. Examples of sample adaptation data usable by an adaptation module of a software product include recordings of: verbal text for an ASR product; images of the user's face for a face recognition product; voice data for a voice recognition product; personal data for a system that identifies a person by querying the person about personal data; etc.

At step 16, the sample adaptation data is accessed, and preferably stored, in accordance with the access instructions. Preferably the recorded sample adaptation data is stored in the HPP database.

At step 17, a determination is made if the selected product is an ASR product. If the selected product is an ASR product then the verbal data of the sample adaptation data is transcribed at step 18. Otherwise the transcription at step 18 is skipped.

The process continues at step 20, in which the sample adaptation data associated with the HPP person is used to train the recognition product to adapt to the HPP person. Communication is established with the adaptation software of the product, for example by instructing the recognition product to run and proceeding to the training process provided by the adaptation module of the product. The adaptation software of the product is provided with segments of the sample data as the adaptation software steps through adaptation of the product to the user in accordance with the sample adaptation data.

At step 22, the adapted recognition product is provided to the HPP person for their use. The adapted product may be delivered to the HPP person, or be available for the HPP person to access. At step 24, use of the recognition product by the HPP person is tracked, such as by monitoring the number of times the HPP person accesses the adapted product, and the results are stored as tracking data. At step 26 the HPP person is interrogated regarding his satisfaction with the product, and the results are stored as feedback data. At step 28 an offer is presented to the HPP person to provide compensation to the HPP person in exchange for their consent to endorse the product and to use the tracking data and feedback data associated with the person in advertisements of the selected product. At step 30 the compensation and nature of the endorsement are negotiated and finalized. The compensation may be to provide the HPP person with ownership of the adapted product itself, or may be a fee. At step 32, the tracking data and feedback data are used to advertise the selected recognition product.

Figure 2:
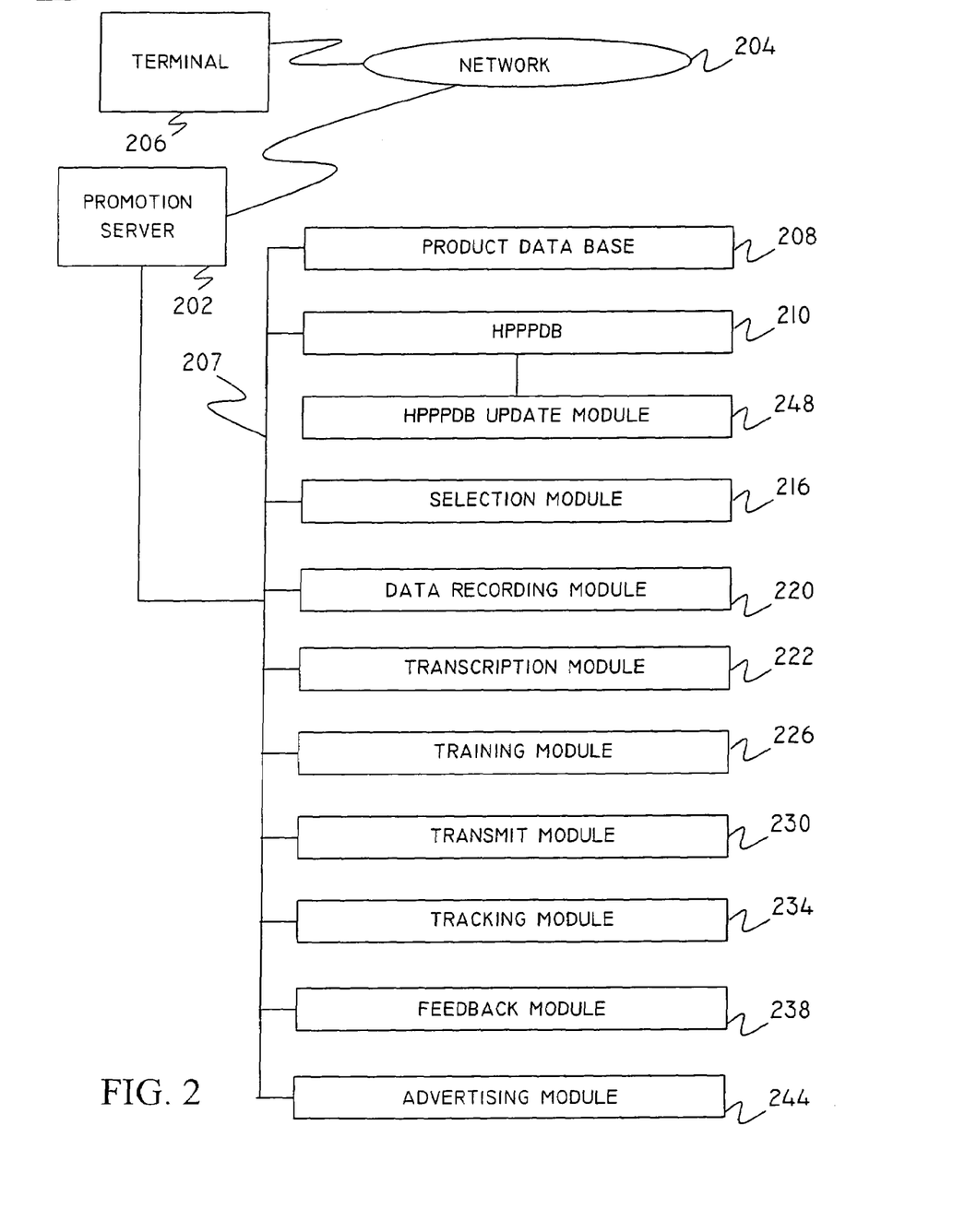
FIG. 2 is representative diagram of a system for performing the method of the first embodiment of the present invention.

FIG. 2 illustrates a system 200 in accordance with the first embodiment of the present invention for promoting use of the recognition product. The system 200 comprises promotion server 202 in communication via network 204 with a computer terminal 206 operated by a selected HPP person. In the preferred embodiment the network 204 is the Internet. The computer terminal 206 is provided with a network browser for accessing the Internet. The promotion server 202 may provide a web site via which to exchange information with the HPP person operating computer terminal 206.

The promotion server 202 is further in communication, via network 207, with a product database 208, storing a collection of recognition products and information associated with the stored recognition products; an HPP person database (HPPPDB) 210, storing a collection of HPP persons and data associated with the stored HPP person; a selection module 216; a data recording module 220; a transcription module 222; a training module 226; a transmit module 230; a tracking module 234; a feedback module 238; and an advertising module 244. An HPPPDB update module 248 is provided for updating and maintaining the data stored in the HPPPDB 210 to be current as needed.

The promotion server 202 may reside on one processor or a plurality of processors. The modules and databases may be included in the promotion server 202 or may be separate entities in communication with the promotion server 202 via network 207. Each module and database may each reside on one or more processors. The modules and databases may share a processor. The functions associated with each module and database may be shared or swapped between the modules. One or more of the functions of the modules and promotion server 202 may further be provided to the computer terminal 206. Network 207 is preferably an intranet. The promotion server 202, modules and databases of the system 200 may be located local to or remote from each other.

The promotion server 202, modules and databases of the system 200 are preferably provided with a user interface for providing an exchange of information between an operator and the system.

The product database 208 stores data relating to one product or a plurality of products. Individual recognition products may use different procedures for training the product to adapt to a user. The product database 208 stores information for each product stored on how the training procedure for the product works.

Figure 3:
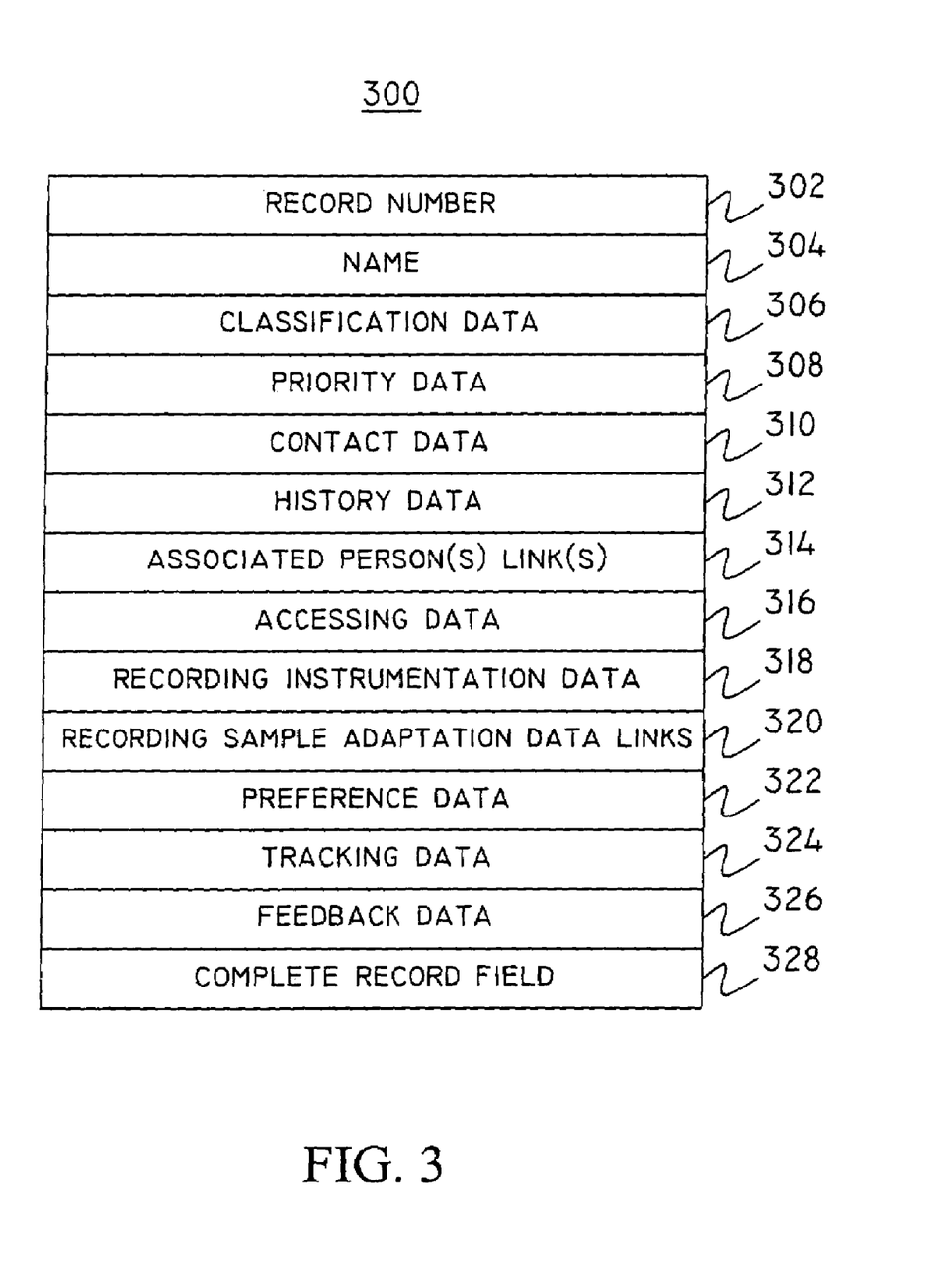
FIG. 3 is a diagram of a record of a database storing data related to high public profile persons for use with a system in accordance with the second embodiment of the present invention.

FIG. 3 shows an exemplary data entry record 300 in which data on a high public profile (HPP) person is stored, the data stored in each field explained further below, At field 302 the record number is stored. At field 304, the name of the HPP person is stored. At field 306, classification data is stored. At field 308, priority data is stored. At field 310, contact data for the HPP person is stored. At field 312, history data is stored. At field 314, a link to a data entry record for at least one person, who is associated with the HPP person, that would be likely to use the recognition product being adapted and provided to the HPP person, is stored. The relationship to the HPP person, such as family member, friend or business co-worker, is specified and stored for each associated person, for example, with the link at field 314, or with the selected HPP person's data record. It is contemplated that in combination or instead of storing data in the HPPPDB 210, data associated with HPP persons may be accessed from at least one remote location by one or more intelligent agents. At field 316, accessing data is stored. The accessing data comprises mode (radio, TV, live performance, etc.), station name, frequency, channel, access (cable, UHF, AM/FM, etc.), where, when and how to access and record sample adaptation data. At field 318, recording instrumentation data is stored, and may include instrument (VCR, camcorder, CDROM burner, etc.), instrument code name, recording medium (VCR tape, CDROM etc.), data format, data quantity, volume setting, allowable noise level, etc.

At field 320, a list of at least one link to files of recorded sample adaptation data are stored, each link having an associated recording medium type. Recording medium types may include for example: video, audio, digital biometric, text, etc. At field 322, preference data is stored. The preference data may be stored as text and provide information about preferences of the HPP person that assist in most effectively providing the HPP person with a recognition product suitable for the person. At field 324, tracking data is stored. The tracking data provides information about usage of the recognition product once the HPP person is provided with a recognition product. At field 326, feedback data is stored. The feedback data comprises feedback by the HPP person regarding his satisfaction with the recognition product. At field 328, a record complete flag is stored for indicating when sufficient data is stored in the record so that the record is available for use with promoting a product.

The HPPPDB update module 248 updates the HPPPDB 210 by providing and storing current information associated with HPP persons already entered in the HPPPDB 210 and by adding new entries 300 to the HPPPDB 210 for HPP persons not yet entered. The information provided by the HPPPDB update module 248 may be obtained by researchers or by automated techniques to search and find desired information. For example, new HPP persons are found by scanning mediums and materials available to the public such as television productions, radio productions, Internet sites, published books, magazines and newspapers to find names of HPP persons such as actors, various types of artists and politicians. Upon finding a new name the update module 248 enters the HPP person's name in the HPPPDB 210 in the name data field 304, and a record number is assigned and stored in the field 302. The entry is classified according to the HPP person's area of fame mentioned in the scanned media by storing classification data in the classification data field 306 associated with the HPP person such as sports, pop music, literature, etc. Information relating to the HPP person's popularity is looked up from available resources such as media polls and total hits for the person's name when scanning media samples. A priority determination is made based on the popularity of the HPP person relative to other HPP persons entered in the HPPPDB 210. Priority data, such as based on a scale from 1 to n, is stored in the HPPPDB 210 in the priority field 308 associated with the HPP person.

Historical data associated with the HPP person is looked up from available media sources and stored as historical data in the HPPPDB 210 in the history field 312 associated with the HPP person. Historical data includes, for example, the type of population with whom the HPP person is popular, such as football fans, teenagers, opera fans, etc.; the area of popularity, such as football, rock & roll music, opera, etc.; where and when they have performed or been published, such as Nov. 8, 1978, Shea Stadium, Queens, N.Y.; Jul. 12, 1982, The Hartford Coliseum, Hartford, Conn.; or Jul. 23, 1984, Carnegie Hall, New York, N.Y.

Data on accessing samples of adaptation data for the product(s) being promoted is looked up from current and past media sources. Data on accessing samples of adaptation data includes information regarding upcoming performances and available recordings from past performances. Examples of data on accessing sample adaptation data include a date, time and location for an upcoming performance or speech by the HPP person; a name and location of a library storing archived news clips, movies, etc. together with a name and data of a previous speech of film by the HPP person. The accessing sample adaptation data is stored in the HPPPDB 210 in the accessing data field 316 associated with the HPP person.

Instrumentation necessary for accessing and recording sample adaptation data is stored in the recording instrumentation data field 318 in association with data stored in the accessing data field 316. Instrumentation data includes for example, a VCR for recording an upcoming speech to be broadcast on television; a camcorder for recording an upcoming public performance; etc.

Characteristics, occupation and hobbies of the HPP person indicative of the type of recognition product the HPP person might be most inclined to use are looked up and a predicted preferred product is determined accordingly. For example, an author may prefer an ASR product, a wealthy person may prefer an advanced security recognition system, and a singer may prefer an embedded device for use in a car. The predicted preferred product is stored as preference data. The preference data may also include data a best mode for providing an adapted product to the user and following up on its use. For example, the person's preferences and level of comfort with technology may be collected and stored as preference data. The preference data is stored in the preference data field 322.

Contact data for the HPP person, such as mailing address(es), phone number(s), and e-mail address(es) that is looked up and stored in the contact field 310. Information regarding other persons associated to the HPP person, such as family, friends and business associates is looked up. The HPPPDB update module 248 creates entries for the associated person in the HPPPDB 210, stores therein information about the associated persons, and stores links to the associated person entries in the associated persons field 314 associated with the HPP person.

Upon storing sufficient data in the BPP person's record 300 for enabling the promotion server 202 to collect sample access data and provide an adapted product to a selected HPP person, the HPPPDB update module 248 sets the complete record flag field 328. Sufficient data may include name data, contact data, accessing data and recording instrumentation data. The HPPPDB update module 248 may continue to update the person s record 300 even when the complete flag field has been set.

The operation of the system of the present invention will now be described with reference to FIGS. 2 and 3 after the HPPPDB 210 is updated. The selection module 216 selects an HPP person from completed HPP person entries in the BPPPDB 210 in accordance with the prioritization data associated with the HPP person. In other embodiments the selection may be made, for example, randomly, according to criteria specified in a request by an operator of the server 202 entered via the UI of the server 202, or according to a specific sequential order.

The data recording module 220 retrieves from the HPP-PDB 210 data for accessing sample adaptation data from the accessing data field 316 associated with the selected HPP person. The retrieved accessing data comprises information indicating when, how and where to access sample adaptation data for the selected HPP person. The data recording module 220 retrieves associated recording instrumentation data from data field 318.

The data recording module 220 provides the instructions necessary for executing the recording of the sample adaptation data to an operator of a recording device for manual operation of the recording instrument or to the device itself for automatic recording of sample access data. The data recording 220 module may further comprise or access a conversion module (not shown) for converting recorded analog data into a digital format when required for automatic training of a product. The data recording module 220 stores the recorded data in the HPPPDB 210 as the sample adaptation data with links thereto stored in the recorded data field 320. The stored recorded data may be indexed according to criteria such as HPP person name, data type, date/time of recording, location of recording, etc. for easy access thereto. In a preferred embodiment, the data recording module 220 comprises a verification module. The verification module verifies that the data being accessed by the recording device is associated with the selected HPP person. The verification is performed manually and/or automatically by comparing previously recorded and stored sample adaptation data associated with HPP person, with the data being accessed. Verification may be performed using biometric data such as voiceprints and/or facial features.

The transcription module 222 processes verbal data included in the sample adaptation data that is to be used for training the adaptation module of an ASR product. The transcription module 222 produces textual data time stamped to correspond to the verbal data. The time stamped text data is included with the verbal data in the sample adaptation data. The transcription may be performed automatically such as by processing the verbal data using automatic transcription software. Alternatively, or in combination with automatic transcription, the transcription may be performed manually such as by a stenographer.

Generally, and in a preferred embodiment, a product is selected for promotion, and, as described above, HPP persons having preference data compatible with the selected product are selected to receive an adapted product. The product is selected from a collection of at least one product, stored in the product database 208, which is accessible by the training module 226. The collection may be owned by one owner that uses the system 200 to promote his own products or, alternatively, may be owned by different owners who pay a fee to a promotional service that uses the system 200 to promote the product. The selection of a product may be performed by the selection module 216 or the training module 226.

The selected product is accessed by the training module 226, loaded on to a processor, if not already loaded, and activated to run on the processor. The training module 226 accesses the product database 208 to retrieve data including instructions for running, operating and training the product. The processor running the product may be included in the training module 226 or may be accessible by the training module 226. The training module 226 proceeds to the training process provided by the adaptation module of the product.

A product having an adaptation module generally comprises a user interface for requesting and receiving sample data from a user of the product that the adaptation module uses for adapting the product. The training module 226 may have its own user interface or utilize a user interface of the promotion server 202 for allowing an operator of the system to exchange information with the training module 226. The training module 226 establishes communication with the adaptation module of the product by a combination of one or more means for exchanging information including via a physical communication connection for exchanging signals between the training module 226 and the adaptation module of the product, or via inputting and outputting data via at least one of the user interfaces of the selected product and the training module 226. The communication between the training module 226 and the adaptation module of the product may be assisted by an operator of the training module 226.

During the training process the training module 226 provides the adaptation module with information requested by the adaptation module. The training module 226 provides the adaptation module with segments of the sample adaptation data or with access to data files of sample data as it is requested. The training module 226 proceeds with the training process by continuing to provide the adaptation module with the information and data it requires to adapt the product to the selected HPP person until both the training module 226 and the adaptation module have completed exchanging information. The training module 226 may store the adapted product, for example in the HPPPDB 210 or other accessible storage.

The transmit module 230 provides the adapted product to the selected HPP person. The adapted product is accessed by the transmit module 230 from storage such as the HPPPDB 210 or from the training module 226 and may be transmitted to the HPP person via the HPP person's computer terminal. The transmit module 230 retrieves from the HPPPDB 210 contact information associated with the selected HPP person. The contact information may be a conventional mailing address or an e-mail address, and may be accompanied by a letter to the selected HPP person. It may be sent as a file (via e-mail or on a disk via conventional mail) or may provide access information to the adapted product including notification of the existence and access to the product such as by telephone. The product may be provided directly to the selected HPP person such as by shipping, delivering and installing on the selected HPP person's computer system, or by providing the selected HPP person with access to an adapted product that is being stored by the system 200. The HPP person may be provided with the option to refuse receipt of the adapted product and/or to return the adapted product to the transmit module, resulting in termination of contact with the selected HPP person, followed by selection of a different HPP person from the HPPPDB 210.

An agreement may be arranged between the selected HPP person and at least one of the owner of the product and the promotional service that the selected HPP person is provided with the product or use of the product in exchange for an endorsement of the product.

Additionally, the adapted product may be trained for use by associated persons having links to the selected HPP person by collecting sample access data for each associated person and training the product in accordance with the sample data. The associated persons may be selected by the server 202 or by an operator of the server 202.

The tracking module 234 tracks use of the adapted product provided to the selected HPP person. The tracking may be automatic such as by monitoring use of the adapted product by the selected HPP person, and/or retrieving and monitoring status information supplied by the adapted product or the selected HPP person's computer system 206 running the product. The tracking data is stored in the tracking data field 324 associated with the selected HPP person of the HPPPDB 210.

The feedback module 238 requests feedback information regarding the selected HPP person's satisfaction with the adapted product and receives the selected HPP person's response. The feedback module 238 uses contact data associated with the selected HPP person from the HPPPDB 210 to provide a questionnaire requesting feedback information. The questionnaire and the responses may be exchanged between the selected HPP person and the system 200 via any communication mode included in the contact data such as telephone, mailing address, e-mail address. The feedback module 238 stores the feedback responses of the selected HPP person in the feedback data field 326 associated with the selected HPP person of the HPPPDB 210.

The feedback data and tracking data are accessed by the advertising module 244, which popularizes the product by advertising use of the product and positive feedback by the selected HPP person. The advertising module 244 determines if the tracking data and feedback data indicate that the selected HPP person used the product and was satisfied with the product. If so, the advertising module 244 makes an offer and negotiates with the selected HPP person for providing compensation to the selected HPP person in return for their endorsement. Upon reaching an agreement with the selected HPP person, the advertising module 244 uses the media or other known advertising modes for advertising the product. For effective advertising, the advertising module 244 may access the HPPPDB 210 to retrieve information regarding the selected HPP person, such as historical data about the selected HPP person, which will be beneficial for directing advertising to specific populations.

While the present invention has been described in detail with reference to the preferred embodiments, they represent mere exemplary applications. Thus, it is to be clearly understood that many variations can be made by anyone having ordinary skill in the art while staying within the scope and spirit of the present invention as defined by the appended claims.

The invention claimed is:

1. A method for promoting use of a software product having an adaptation module, the method comprising the steps of:
   selecting at least one software product to promote and selecting at least one person from a database by utilizing a predetermined selection criterion, wherein the predetermined selection criterion comprises endorser data;
   determining whether the selected software product is one of an ASR (Automatic Speech Recognition) product, a recognition product, and a biometric product;
   scanning a network for sample data related to the selected person based upon the determination and saving the sample data in a sample data database;
   adapting, using the adaptation module, the selected product utilizing the corresponding sample data based on the determination step for the selected person, and transcribing a verbal sample of the sample data when the software product is an ASR product;
   providing the adapted software product to the person for at least one of the person's approval and use;
   tracking the person's usage of the software product;
   negotiating an endorsement agreement with the person if the person is satisfied with the software product; and
   promoting the person's use of the software product using information collected about the person and information related to the endorsement agreement.

2. The method according to claim 1, wherein the step of selecting the person from a person database includes using stored data associated with the person, the associated data including the sample data associated with the person.

3. The method according to claim 1, wherein the step of selecting the one software product to promote includes selecting the software product from a plurality of software products available for promotion stored in a database.

4. The method according to claim 1, further comprising the steps of:
   accessing a person database storing data associated with the selected at least one person, wherein the person database stores accessing data associated with the selected at least one person, the accessing data providing instructions for accessing the sample data;
   retrieving accessing data associated with the selected person; and
   accessing the sample data based on the retrieved accessing data.

5. The method according to claim 2, further comprising the steps of:

tracking use of the software product adapted to the selected person; and storing data in the person database as tracking data associated with the selected person.

6. The method according to claim 5, further comprising the steps of:

obtaining feedback data from the selected person regarding the selected person's satisfaction with the software product; and storing the feedback data in the person database in association with the selected person.

7. The method according to claim 6, further comprising the steps of:

incorporating the tracking data and the feedback data associated with the selected person into an advertisement; and advertising the product.

8. The method according to claim 2, further comprising the steps of:

scanning publicly available material for finding a name of a person not entered in the person database and data associated with a person having an entry in the person database;

updating the person database by adding a found name of a person not entered in the person database; and updating the person database by adding data associated with a person having associated data stored in the database.

9. A system for promoting the use of a selected software product having an adaptation module, the system comprising:

a database for:
   storing at least one software product to promote and information associated with at least one person; and
a server for:
   selecting the at least one software product to promote and the at least
one person from the database by utilizing a predetermined selection criterion,
wherein the predetermined selection criterion comprises endorser data;
   determining whether the selected software product is one of an ASR (Automatic Speech Recognition) product, a recognition product, and a biometric product;
   scanning a network for sample data related to the selected person based upon the determination and saving the sample data in a sample data database;
   adapting the selected product utilizing the corresponding sample data based on the determination step for the selected person;
   providing the adapted software product to the person for at least one of the person's approval and use;
   tracking the person's usage of the software product;
   negotiating an endorsement agreement with the person if the person is satisfied with the software product; and
   promoting the person's use of the software product using information collected about the person and information related to the endorsement agreement.

10. The system according to claim 9, further comprising a person database for storing the sample data in association with the selected person.

11. The system according to claim 9, wherein the server accesses a product database storing product data associated with at least one product, wherein for each product of the at least one product the product data includes instructions for using the product and adapting the product to a user, and wherein the server retrieves the product data associated with a product selected for promotion and uses the instructions included in the associated product data to adapt the selected product to the person.

12. The system according to claim 11, wherein the server further comprises a user interface for allowing an operator of the server to select at least one of a product for promotion and a person for promoting the selected product.

13. The system according to claim 9, wherein the data associated with the at least one person further includes contact data including information for one of providing data to the at least one person and providing the at least one person with access to data, and wherein the server uses the contact information for making the adapted product available to the at least one person.

14. The system according to claim 9, wherein the accessing data further includes recording instrumentation data for providing instructions to one of a device and an operator of a device for recording the sample data, and wherein the server uses the recording instrumentation data for providing instructions to one of a device and an operator of a device for recording the sample data.

15. The system according to claim 9, wherein the data associated with at least one person further includes associated persons data including accessing data for accessing sample data associated with at least one associated person, wherein the server uses the sample data associated with the at least one associated person to adapt the product to the at least one associated person.

16. The system according to claim 9, further comprising a person database update module, wherein the update module scans publicly available material for:

finding a name of a person not entered in the person database and enters the found name in the person database; and finding data associated with a person already having associated data stored in the person database and adds the found data to the data associated with the person already having associated data stored in the person database.

17. A method for promoting the use of an automatic recognition software product, the method comprising:

selecting at least one software product to promote and selecting at least one person from a database by utilizing a predetermined selection criterion, wherein the predetermined selection criterion comprises endorser data;

determining whether the selected software product is one of an ASR (Automatic Speech Recognition) product, a recognition product, and a biometric product;

scanning a network for sample data related to the selected person based upon the determination and saving the sample data in a sample data database;

adapting the selected product utilizing the corresponding sample data based on the determination step for the selected person;

providing the adapted software product to the person for at least one of the person's approval and use;

tracking the person's usage of the software product;

negotiating an endorsement agreement with the person if the person is satisfied with the software product; and promoting the person's use of the software product using information collected about the person and information related to the endorsement agreement.

* * * * *